(12) United States Patent
Lei et al.

(10) Patent No.: US 10,889,967 B2
(45) Date of Patent: Jan. 12, 2021

(54) VACUUM BREAKER WITH BACK FLOW PREVENTER

(71) Applicant: GOODRICH CORPORATION, Charlotte, NC (US)

(72) Inventors: Martin Lei, Canal Fulton, OH (US); Kevin Edward Roach, Stow, OH (US); Michael Anthony Ziska, Cuyahoga Falls, OH (US)

(73) Assignee: Goodrich Corporation, Charlotte, NC (US)

( * ) Notice: Subject to any disclaimer, the term of this patent is extended or adjusted under 35 U.S.C. 154(b) by 65 days.

(21) Appl. No.: 16/413,270

(22) Filed: May 15, 2019

(65) Prior Publication Data
US 2020/0362546 A1 Nov. 19, 2020

(51) Int. Cl.
*E03B 7/07* (2006.01)
*F16K 15/04* (2006.01)
*E03C 1/10* (2006.01)

(52) U.S. Cl.
CPC ............ *E03B 7/077* (2013.01); *E03C 1/10* (2013.01); *F16K 15/04* (2013.01)

(58) Field of Classification Search
CPC ............. E03B 7/077; E03C 1/10; F16K 16/04
See application file for complete search history.

(56) References Cited

U.S. PATENT DOCUMENTS

| | | | | |
|---|---|---|---|---|
| 3,766,575 | A * | 10/1973 | Grengs | B60P 3/36 4/210 |
| 4,358,864 | A | 11/1982 | Medrano | |
| 5,358,009 | A * | 10/1994 | Cambell | B67D 7/002 137/209 |
| 5,372,158 | A * | 12/1994 | Berfield | E03C 1/104 137/217 |
| 6,035,458 | A * | 3/2000 | Tarzia | F16K 11/044 137/218 |
| 6,123,095 | A | 9/2000 | Kersten et al. | |
| 6,543,474 | B2 * | 4/2003 | Fetterman, Jr. | F16K 15/03 122/14.31 |
| 7,503,082 | B2 * | 3/2009 | Castellote | A61H 33/02 137/389 |
| 9,096,321 | B2 | 8/2015 | Burd | |
| 9,469,402 | B2 | 10/2016 | Burd | |
| 9,617,720 | B2 | 4/2017 | Burd | |

* cited by examiner

*Primary Examiner* — Kevin R Barss
(74) *Attorney, Agent, or Firm* — Snell & Wilmer L.L.P.

(57) ABSTRACT

A dual purpose valve assembly may comprise a conduit, a first valve, and a second valve. The first valve may comprise a vacuum breaker valve. The second valve may comprise a check valve. A drain system may comprise a supply tube, a drain tube, and a dual purpose valve disposed between the supply tube and the drain tube. The drain system may allow fluid to drain based on gravity alone, and the dual purpose valve assembly may operate based on gravity alone.

13 Claims, 10 Drawing Sheets

FIG. 1

KEY

- - -> VACUUM DIRECTION

——> FLOW DIRECTION

VACUUM BREAKER WITH BACK FLOW PREVENTER

FIELD

The present disclosure is directed to valves, and more particularly to vacuum breaker valves with back flow prevention for use in a potable water system and/or the associated drain system.

BACKGROUND

Valves are used for various drain systems. Two drain lines that may not be cross contaminated are often maintained as separate drain lines. A drain line may be limited by available space and/or drain slope, where it may be beneficial to intersect two drain lines that may not be cross-contaminated. Distribution of potable water to sinks, wash basins, and other facilities generally employ an air gap, but where an air gap is impractical, a backflow preventer with vacuum breaker function can be used.

SUMMARY

A dual purpose valve assembly, in accordance with various embodiments, is disclosed herein. The dual purpose valve assembly may comprise a conduit, a first valve, and a second valve. The conduit may comprise a first port, a second port, and a third port. The first valve may be configured to have a first open position and a first closed position with the first port, the first valve being configured to close the third port when it is in the first open position, and the first valve being configured to open the third port when it is in the first closed position. The second valve may be configured to have a second open position and a second closed position with the second port.

In various embodiments, the second valve may be configured to prevent a backflow condition. The first valve may comprise a flapper, the flapper being hingedly coupled to the conduit between the first port and the third port. The first valve may be a vacuum breaker valve and the second valve may be a check valve. The vacuum breaker valve may be a flapper. The second valve may comprise a ball and an O-ring, the ball being configured to float, contact, and create a seal with the O-ring when the second valve is in the second closed position. The second valve may further comprise a form, the form being configured to hold the ball when the second valve is in the second open position.

A dual purpose valve assembly, in accordance with various embodiments, is disclosed herein. The dual purpose valve assembly may comprise a conduit, a flapper, and a check valve. The conduit may have a vacuum breaker cavity, a check valve cavity, a first port, a second port, and a third port. The flapper may be disposed in the vacuum breaker cavity between the first port and the third port. The check valve may be disposed in the check valve cavity between the vacuum breaker cavity and the second port.

In various embodiments, the check valve further comprises a ball and an O-ring, the ball being configured to float, contact, and create a seal with the O-ring when the check valve is in a closed position. The check valve may further comprise a form, the form being configured to hold the ball when the check valve is in an open position. The dual purpose valve assembly may further comprise a cover disposed at the third port, the cover being configured to prevent debris from entering the dual purpose valve assembly. The flapper may further comprise a first arm, a second arm, and a fulcrum portion disposed between the first arm and the second arm. The first arm may create a first seal with the first port when the flapper is in a closed position, and the second arm may create a second seal with the second port when the flapper is in an open position.

An aircraft, in accordance with various embodiments, is disclosed herein. The aircraft may comprise a potable water system and associated drain system. The potable water system and associated drain system may comprise a supply tube, a drain tube, and a dual purpose valve assembly. The dual purpose valve assembly may be disposed between the supply tube and the drain tube. The dual purpose valve assembly may comprise a conduit, a vacuum breaker valve, and a check valve. The conduit may comprise an inlet port, an outlet port, and an air inlet port. The inlet port may be coupled to the supply tube. The outlet port may be coupled to the drain tube. The air inlet port may be open to ambient air. The vacuum breaker valve may be disposed between the inlet port and the air inlet port. The check valve may be disposed between the outlet port and the vacuum breaker valve.

In various embodiments, the drain system may be configured to operate on gravity from a draining fluid. The dual purpose valve assembly may further comprise conduit having a first port coupled to the supply tube, a second port coupled to the drain tube, and a third port fluidly coupled to ambient air. The dual purpose valve assembly may further comprise a flapper hingedly coupled to the conduit, the flapper being disposed between the first port and the third port. The check valve may further comprise a ball and an O-ring disposed within the conduit between the flapper and the second port. The flapper may further comprise a first arm, a second arm, and a fulcrum portion disposed between the first arm and the second arm, the first arm being configured to seal the first port when the flapper is in a flapper closed position, and the second arm being configured to seal the third port when the flapper is in a flapper open position. The supply tube may be at a first angle above a horizontal plane between 1 degree and 8 degrees, and the drain tube may be at a second angle below the horizontal plane between 1 degree and 8 degrees.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

An aircraft may include drain system configured to drain both fresh water and grey water. Grey water, as described herein, is the relatively clean waste water collected after washing from a sink or shower, or any other relatively clean waste water known in the art, and grey water does not include waste water from a toilet. Aircrafts may have sinks within the fuselage of the aircraft that drain the waste water to a drain mast. Similarly, a fresh water supply, such as a fresh water supply to a toilet, or a sink, in the aircraft, may drain to a drain mast as well. A fresh water supply often contains a supply drain line separate from the grey water drain line in order to avoid cross contamination. A dual purpose valve may allow a fresh water supply line to drain through a grey water drain without the risk of cross contamination of the grey water to the fresh water supply. A dual purpose valve may allow distribution of fresh water to sinks, wash basins, and other facilities where an air gap is impractical.

A dual purpose valve, as disclosed herein, is a vacuum breaker and a back flow preventer, thereby allowing the drain system to be drained without a vacuum lock and preventing backflow from an unwanted source downstream.

The dual purpose valve may also be gravity operated and controlled, thereby being operative without any line pressure.

Figure 1:
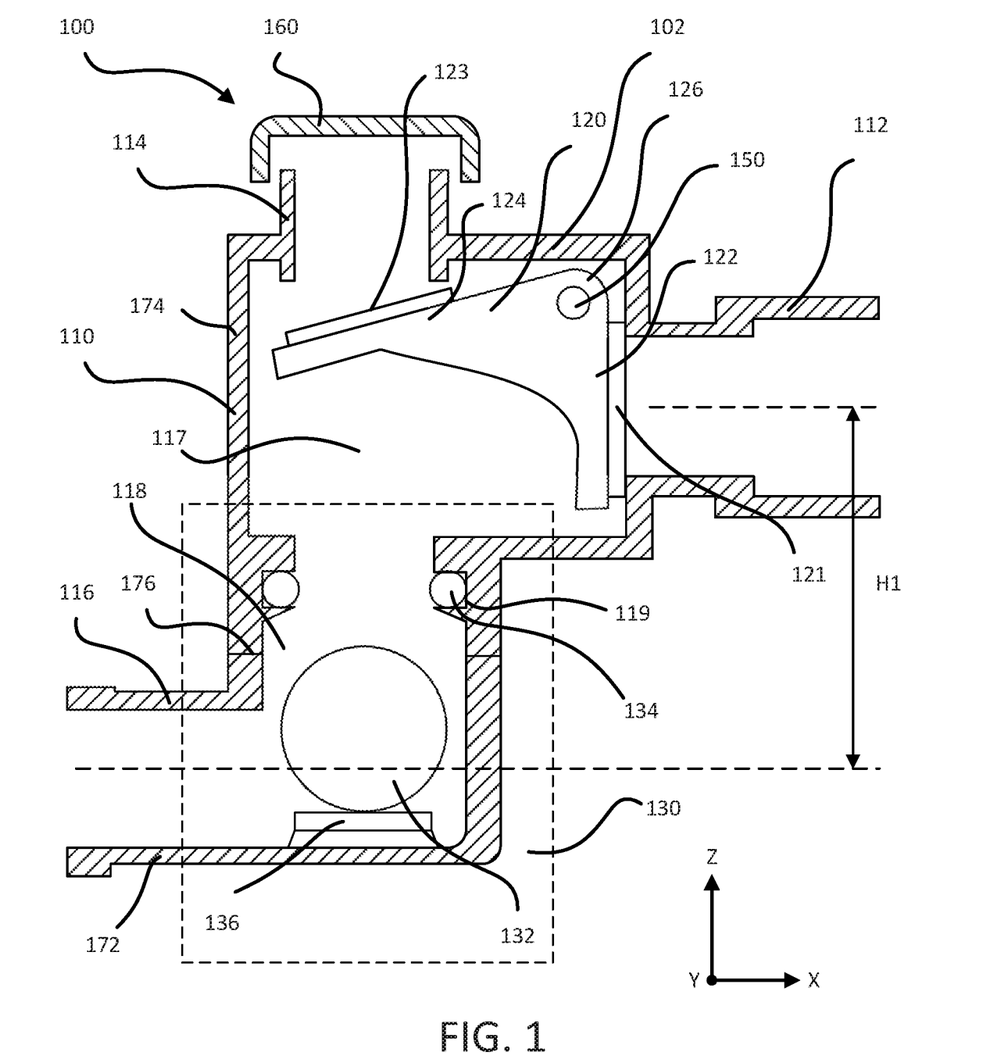
FIG. 1 illustrates a section view of a dual purpose valve assembly, in accordance with various embodiments.

With reference now to FIG. 1, a dual purpose valve assembly 100, in accordance with various embodiments, is depicted. A dual purpose valve assembly 100 comprises a conduit 110, a vacuum breaker valve 120 and a check valve 130. In various embodiments, the conduit 110 comprises a first port 112, a second port 116, a third port 114, a vacuum breaker cavity 117, and check valve cavity 118. In various embodiments, the first port 112 is a supply port, the third port 114 is an air inlet port, and the second port 116 is a drain port. In various embodiments, the first port 112 may be disposed on a first side portion of the conduit 110, the third port 114 may be disposed on a top portion 102 of the conduit 110, and the second port 116 may be disposed on a second side of the conduit 110, the second side being opposite the first side. In various embodiments, the second port may be disposed on the bottom portion of the conduit 110. In various embodiments, the entrance to first port 112 is disposed at a height H1 above the exit to the second port 116. The vacuum breaker cavity 117 is disposed at an intersection of the first port 112 and the third port 114. The check valve cavity 118 is disposed between the vacuum breaker cavity 117 and the second port 116. In various embodiments, the vacuum breaker valve 120 is a flapper.

In various embodiments, an axis of the first port 112 and an axis of the second port 116 may be substantially parallel to each other. In various embodiments, substantially parallel may mean plus or minus 15 degrees. In various embodiments, the first port 112 is between 0 and 30 degrees above the X-Y plane. The first port 112 may be between 0 and 20 degrees above the X-Y plane. The first port 112 may be between 0 and 10 degrees above the X-Y plane. In various embodiments, the third port 114 may have an axis that is substantially vertical. In various embodiments, substantially vertical is plus or minus 15 degrees from the vertical Z-axis. In various embodiments, the second port 116 is between 0 and 30 degrees below the X-Y plane. The second port 116 may be between 0 and 20 degrees below the X-Y plane. The second port 116 may be between 0 and 10 degrees below the X-Y plane. In various embodiments, the dual purpose valve assembly 100 further comprises a dust cover 160. The dust cover 160 may cover the third port 114.

In various embodiments, the first port 112 may be configured to supply fluid from a source within an aircraft, such as a sink drain, supply drain, or any other draining source known in the art. The third port 114 may be configured to fluidly couple and/or vent the conduit 110 to ambient air. The second port 116 may be configured to route the fluid downstream to a drain mast. The fluid being supplied by the first port 112 travels through the vacuum breaker cavity 117 and the check valve cavity 118 when draining. The dust cover 160 may be configured to prevent dust and/or debris from entering the conduit 110. The dust cover 160 is configured to allow air to enter third port 114.

In various embodiments, the vacuum breaker valve 120 is coupled to the conduit 110. The flapper comprises a first arm 122 and a second arm 124. The first arm 122 may comprise a first sealing pad 121. Similarly, the second arm 124 may comprise a second sealing pad 123. In various embodiments, the first port 112 may comprise a sealing pad and/or the third port 114 may comprise a sealing pad. In various embodiments, the vacuum breaker valve 120 comprises a fulcrum portion 126. The fulcrum portion 126 is hingedly coupled to the conduit 110 creating a fulcrum 150 about which the vacuum breaker valve 120 pivots. In various embodiments, the flapper is disposed between the first port 112 and third port 114. In a neutral state, the first arm 122 of the vacuum breaker valve 120 may contact the first port 112 and the second arm 124 of the vacuum breaker valve 120 may be proximate, but not in contact with, the third port 114.

In various embodiments, the vacuum breaker valve 120 is configured to open upon receiving minimal force from a fluid traveling through first port 112 into the vacuum breaker cavity 117. The vacuum breaker valve 120 may be configured to rotate about the fulcrum 150 and allow fluid to pass into the vacuum breaker cavity 117 through the check valve cavity 118 and out the second port 116.

In various embodiments, the check valve cavity 118 may comprise a groove 119 disposed at the inlet to the check valve cavity 118. In various embodiments, a check valve 130 comprises an O-ring 134 and ball 132. The O-ring 134 may be disposed within the groove 119, and the ball 132 may be disposed within the check valve cavity 118 between the outlet of the check valve cavity 118 and the O-ring 134. The ball 132 may have a diameter greater than the diameter of the outlet of the check valve 130. Similarly, the diameter of the ball 132 may be greater than the inner diameter of the O-ring 134. In various embodiments, the check valve further comprises a form 136 to hold the ball 132, when the check valve 130 is in an open position. In various embodiments, the form 136 may be a wire holder in the shape of a ring, a spiral, or the like.

By having an O-ring inner diameter that is less than the ball 132 and an outlet of the check valve cavity 118 that is less than the ball 132, the ball 132 may remain in the check valve cavity 118. In various embodiments, the conduit 110 may comprise two pieces. The first piece may be a check valve conduit portion 172 and a vacuum breaker conduit portion 174. The vacuum breaker conduit portion 174 may be coupled to check valve conduit portion 172 at a conduit interface 176. In various embodiments, the vacuum breaker conduit portion 174 and the check valve conduit portion 172 may be threadingly coupled together at conduit interface 176. In various embodiments, check valve conduit portion 172 and the vacuum breaker conduit portion 174 may be welded together. The ball 132 may be configured to create a seal with the O-ring 134 in a backflow condition, preventing or tending to prevent fluid from downstream of the exit of second port 116 from entering the vacuum breaker cavity 117. In various embodiments, downstream may be defined as being away from the exit of second port 116 and upstream may be defined as being away from the entrance to the first port 112.

Figure 2A:
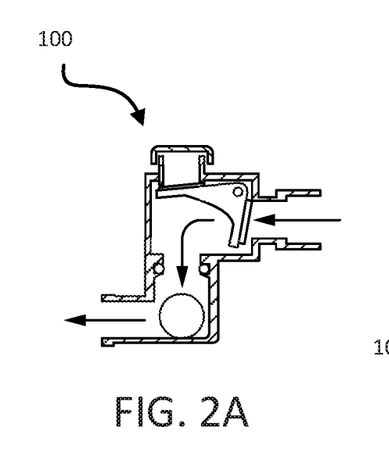
FIGS. 2A, 2B, 2C, and 2D illustrate a schematic, section view of a dual purpose valve assembly in drain condition, backflow condition, vacuum condition from drain, and vacuum condition from the supply, respectively, in accordance with various embodiments.

With reference now to FIG. 2A, a dual purpose valve assembly 100 during a draining operation, in accordance with various embodiments, is depicted. Referring to FIGS. 1 and 2A, during normal draining operation, a supply fluid enters the first port 112 and applies a force to the first arm 122 of the vacuum breaker valve 120. The vacuum breaker valve 120 pivots about the fulcrum 150 and the second sealing pad 123 of second arm 124 may create a seal with third port 114. The supply fluid then travels through vacuum breaker cavity 117 and into check valve cavity 118. During draining operation, the check valve 130 is in an open position. In various embodiments, an open position is when ball 132 is not in contact with O-ring 134. The supply fluid then travels out the check valve cavity 118 through the second port 116 and downstream to a drain mast of the aircraft. As shown, the vacuum breaker valve 120 and the check valve 130 may drain a fluid purely by the gravitational force of the fluid being supplied without any pressure in the supply line.

Figure 2B:
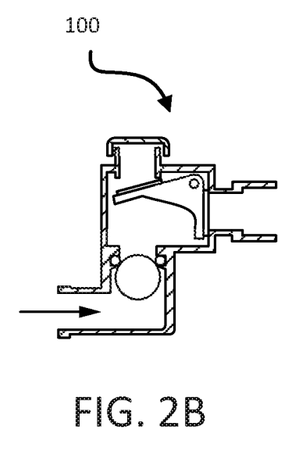

With reference now to FIG. 2B, a dual purpose valve assembly 100 during a backflow condition, in accordance with various embodiments, is depicted. A backflow condition is a condition where fluid from downstream of the dual purpose valve assembly 100 flows upstream and into the dual purpose valve assembly 100. Referring now to FIGS. 1 and 2B, under a backflow condition, fluid travels into the second port 116 and contacts the ball 132, lifting the ball 132 into contact with the O-ring 134. In a backflow condition, the O-ring 134 is configured to create a seal with the ball 132 and prevent any of the downstream fluid from entering the vacuum breaker cavity 117. Thus, the check valve 130 is in a closed position under a backflow condition. In various embodiments, the check valve 130 may prevent a downstream fluid from traveling upstream and out the first port 112.

Figure 2C:
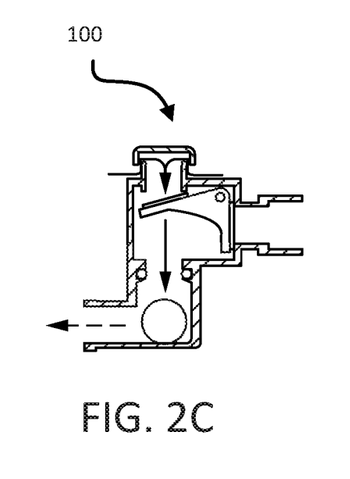

With reference now to FIG. 2C, a dual purpose valve assembly 100 during a vacuum condition from the drain, in accordance with various embodiments is depicted. Referring to FIGS. 1 and 2C, during a vacuum condition from the drain, a suction force may be generated downstream of the dual purpose valve assembly 100. Under a vacuum condition from the drain, the second port 116 may receive air from the third port 114, which may be exposed to ambient air, and pull air from the third port 114 out through the vacuum breaker cavity 117, the check valve cavity 118, and the second port 116 downstream to a drain mast. In various embodiments, in a vacuum condition from a drain, the check valve 130 is in an open position, and the vacuum breaker valve 120 is in a closed position with respect to the first port 112. This may allow the dual purpose valve assembly 100 to handle a drain vacuum condition by breaking the vacuum by drawing from the third port 114, protect components upstream of the dual purpose valve assembly, and/or prevent damage to the dual purpose valve assembly 100.

Figure 2D:
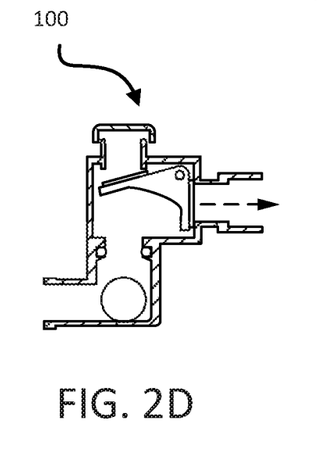

With reference now to FIG. 2D, a dual purpose valve assembly 100, during a vacuum condition from the supply, in accordance with various embodiments is depicted. Referring to FIGS. 1 and 2D, during a vacuum condition from the supply, a suction force may close the vacuum breaker valve 120 with respect to the first port 112. The first sealing pad 121 may seal the first port 112 from the vacuum breaker cavity 117 and expose the vacuum breaker cavity 117 to ambient air from the third port 114. In doing so, the vacuum breaker valve 120 may prevent causing a backflow condition from downstream of the vacuum breaker cavity 117 during a vacuum condition from the supply.

Figure 3:
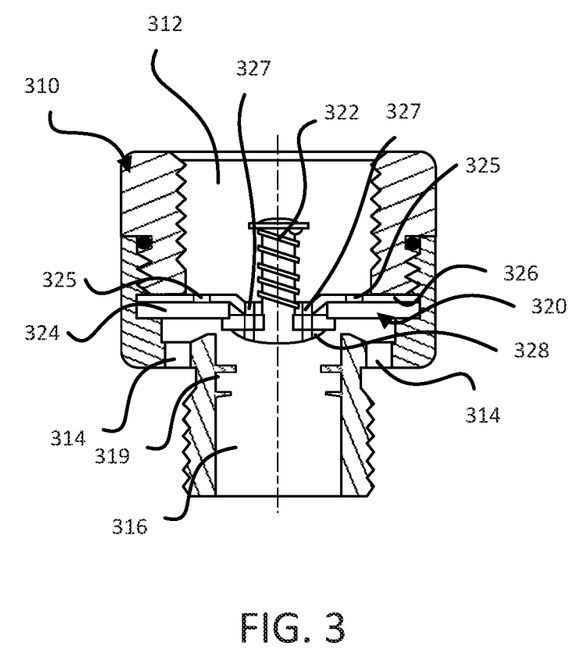
FIG. 3 illustrates a section view of a portion of a dual purpose valve assembly, in accordance with various embodiments.

Referring now to FIG. 3, a portion of a dual purpose valve assembly, in accordance with various embodiments, is depicted. A conduit 310, in accordance with various embodiments comprises, an inlet port 312, at least two air inlet ports 314, and an outlet port 316. The inlet port 312 and the outlet port and 316 may be co-axial. In various embodiments, the outlet port 316 comprises a groove 319. Disposed within the conduit 310 may be a first valve 320. In various embodiments, first valve 320 comprises a spring 322, a diaphragm 324, a metering disk 326 and a stem 328. In various embodiments, the metering disk 326 comprises at least two flow apertures 325 and at least two weeping apertures 327. The first valve 320 is disposed between the inlet port 312 and the outlet port 316. In various embodiments, the first valve 320 comprises a vacuum breaker valve.

In various embodiments, the at least two weeping apertures 327 and the at least two channels fluidly couple the inlet port 312 to the outlet port 316. In various embodiments, the diaphragm 324 is configured to open when fluid enters inlet port 312. When diaphragm 324 is in an open position the at least two air inlet ports 314 are configured to be sealed by the diaphragm 324. The groove 319 is configured to receive an O-ring.

Figure 4:
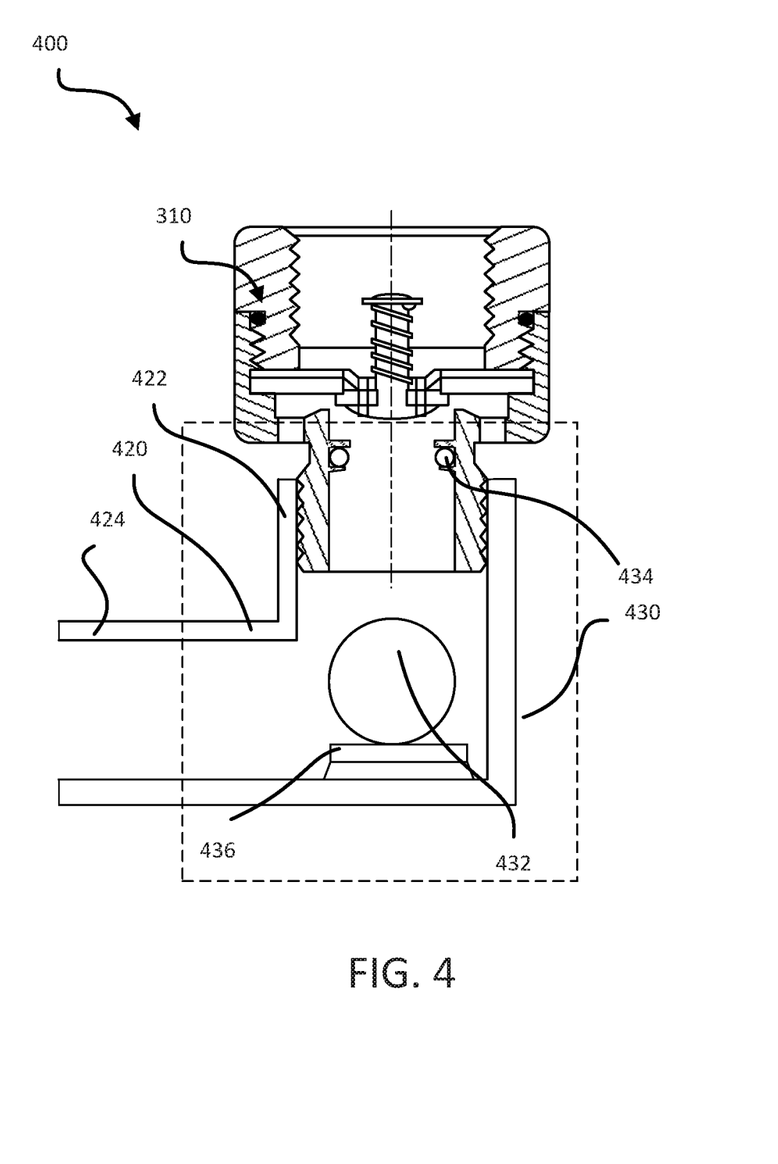
FIG. 4 illustrates a section view of a dual purpose valve assembly, in accordance with various embodiments.

Referring now to FIG. 4, a dual purpose valve assembly 400, in accordance with various embodiments, is depicted. In various embodiments, a dual purpose valve assembly 400 comprises a conduit 310, a fitting 420, and a second valve 430. The second valve 430 may comprise a ball 432 and an O-ring 434. The second valve 430 may further comprise a form 436. The form 436 may comprise a wire holder in the shape of a ring, a spiral, or the like. The fitting 420 comprises an inlet coupling portion 422 and an outlet coupling portion 424. The inlet coupling portion 422 and the outlet coupling portion 424 may form an elbow (an elbow meaning, e.g., forming an angle being 90 degrees plus or minus 45 degrees).

In various embodiments, the form 436 may be configured to prevent the ball 432 from blocking the outlet coupling portion 424. With reference now to FIGS. 3 and 4, the inlet coupling portion 422 may be configured to couple to the outlet port 316 of the conduit 310. The inlet coupling portion 422 may be a female coupling and the outlet port 316 may be a male coupling or vice versa.

Figure 5A:
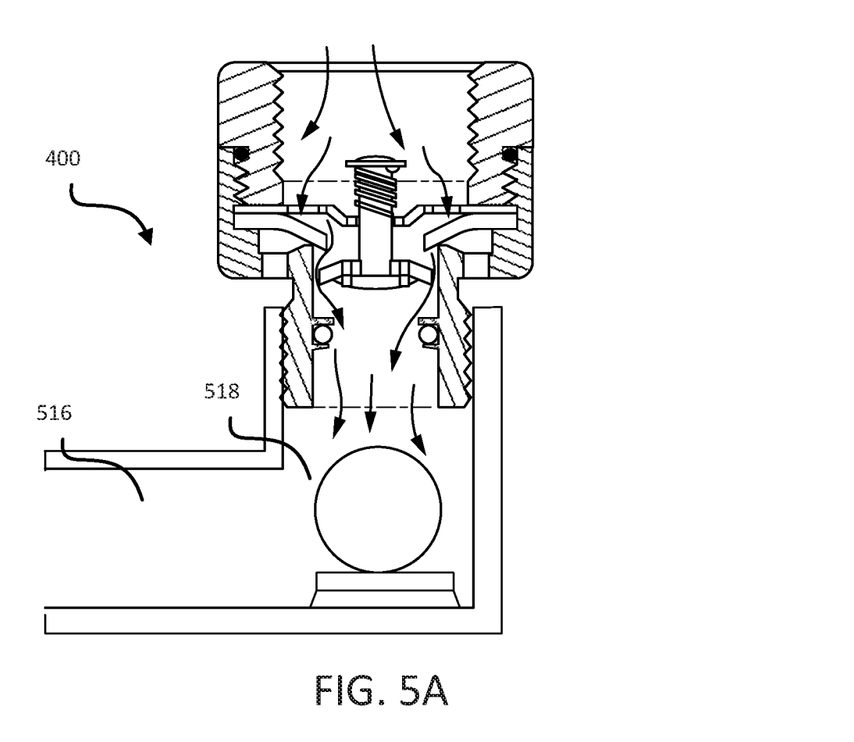
FIGS. 5A, 5B, 5C, and 5D illustrate a schematic, section view of a dual purpose valve assembly in drain condition, backflow condition, vacuum condition from drain, and vacuum condition from the supply, respectively, in accordance with various embodiments.

With reference now to FIG. 5A, a dual purpose valve assembly 400 during a draining operation, in accordance with various embodiments, is depicted. Referring to FIGS. 3, 4, and 5A, during normal draining operation, a supply fluid enters the inlet port 312 and applies a force to the diaphragm 324 of the first valve 320. The diaphragm travels and/or flexes from a closed position to an open position and may create a seal with the at least two air inlet ports 314. The supply fluid then travels through outlet port 316 of the conduit assembly and into a second valve cavity 518. During draining operation, the second valve 430 is in an open position. In various embodiments, an open position is when ball 432 is not in contact with O-ring 434. The supply fluid then travels out the second valve cavity 518 through the outlet coupling port 516 and downstream to a drain mast of the aircraft. As shown, the first valve 320 and the second valve 430 may drain a fluid purely by the gravitational force of the fluid being supplied without any pressure in the supply line. The diaphragm 324 may close, at which time, the remaining fluid may drain through the weeping apertures.

Figure 5B:
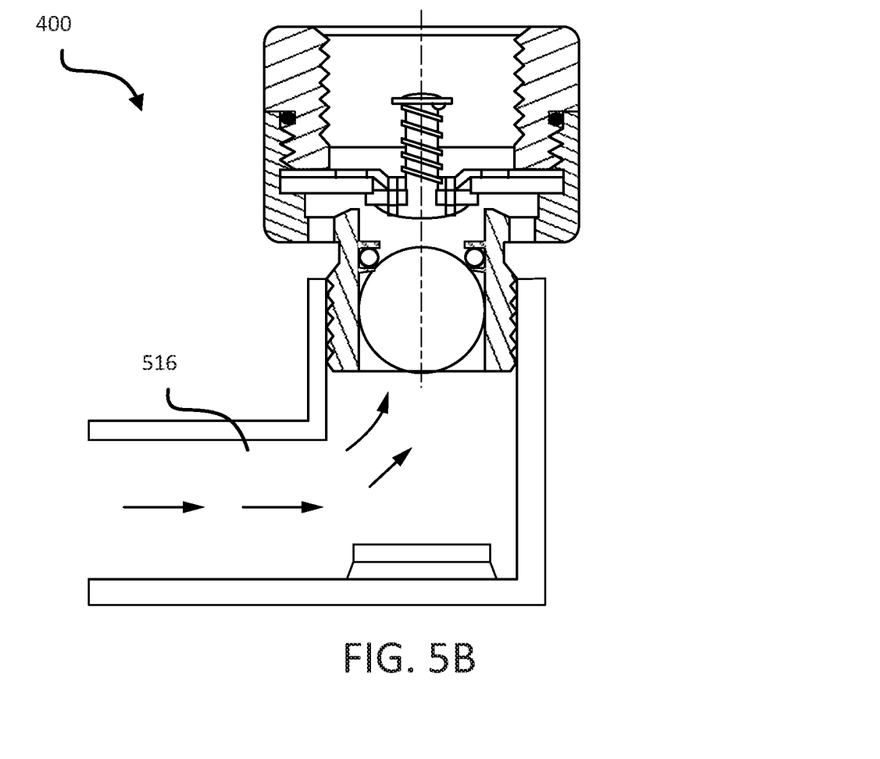

With reference now to FIG. 5B, a dual purpose valve assembly 400 during a backflow condition, in accordance with various embodiments, is depicted. Referring now to FIGS. 3, 4, and 5B, under a backflow condition fluid travels into the outlet coupling port 516 and contacts the ball 432, lifting the ball 432 into contact with the O-ring 434. In a backflow condition, the O-ring 434 is configured to create a seal with the ball 432 and prevent or tend to prevent the downstream fluid from entering the inlet port 312. Thus, the second valve 430 is in a closed position under a backflow condition. In various embodiments, the second valve 430 may prevent a downstream fluid from traveling upstream and out the inlet port 312.

Figure 5C:
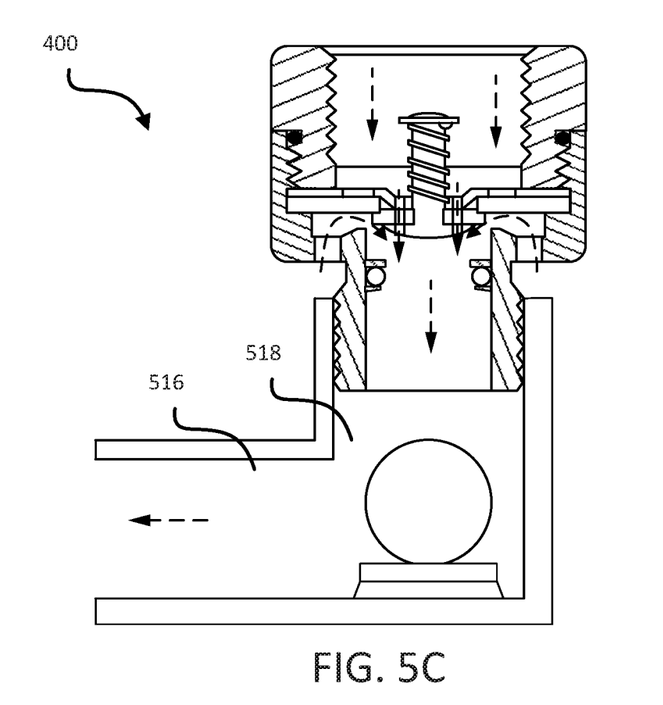

With reference now to FIG. 5C, a dual purpose valve assembly 400 during a vacuum condition from the drain, in accordance with various embodiments, is depicted. Referring to FIGS. 3, 4, and 5C, during a vacuum condition from the drain, a suction force may be generated downstream of the dual purpose valve assembly 400. Under a vacuum condition from the drain, the outlet coupling port 516 may receive air from the at least two air inlet ports 314, which may be exposed to ambient air, and pull air from the at least two air inlet ports 314 out through the second valve cavity 518 and the outlet coupling port 516 downstream to a drain mast. In various embodiments, in a vacuum condition from a drain, the second valve 430 is in an open position, and the first valve 320 is in a closed position with respect to the inlet port 312. This may allow the dual purpose valve assembly 400 to handle a drain vacuum condition by breaking the vacuum by drawing from the at least two air inlet ports 314 and through the at least two weeping apertures 327, protects components upstream of the dual purpose valve assembly, and/or prevent damage to the dual purpose valve assembly 400.

Figure 5D:
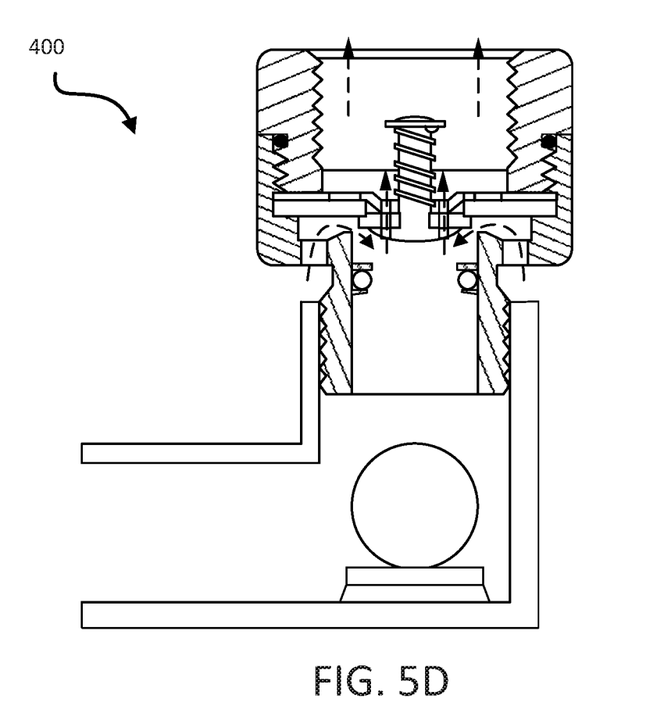

With reference now to FIG. 5D, a dual purpose valve assembly 400, during a vacuum condition from the supply, in accordance with various embodiments is depicted. Referring to FIGS. 3, 4, and 5D, during a vacuum condition from the supply, a suction force may close the diaphragm 324 of the first valve 320 with respect to the inlet port 312. The diaphragm 324 may seal the inlet port 312 from at least two flow apertures 325 and meter airflow from the at least two air inlet ports 314 via the at least two weeping apertures 327. If any fluid is left in the second valve cavity 518, the fluid may spill out through the at least two air inlet ports 314.

Figure 6:
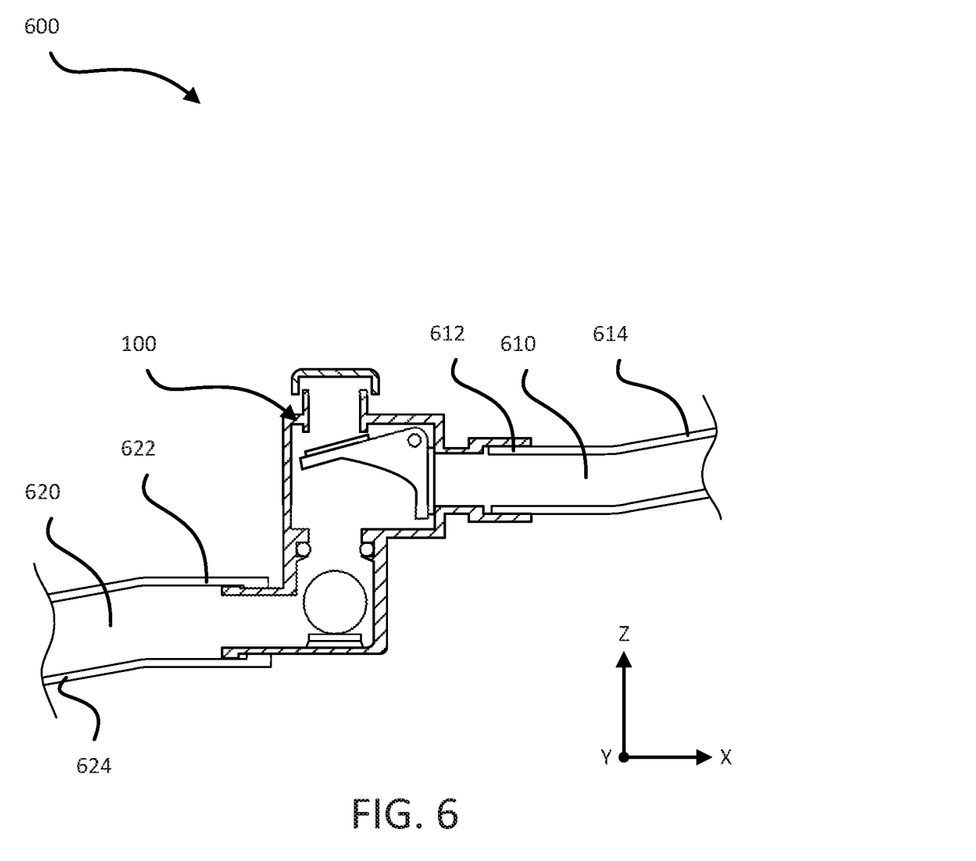
FIG. 6 illustrates a section view of a drain system having a dual purpose valve assembly, in accordance with various embodiments.

With reference now to FIG. 6, a drain system 600, in accordance with various embodiments, is depicted. The drain system 600 comprises a supply tube 610, a drain tube 620 and a dual purpose valve assembly 100. With reference now to FIGS. 1 and 6, the supply tube 610 is coupled to the first port 112 and the drain tube 620 is coupled to the second port 116. In various embodiments, the supply tube 610 may have a coupling end 612 and supply portion 614. The supply portion 614 may be at an angle above the horizontal plane (X-Y plane). In various embodiments the supply portion 614 may have an angle between 0 and 10 degrees above the horizontal plane. In various embodiments, the supply portion 614 may have an angle between 1 and 8 degrees above the horizontal plane. Similarly, the drain tube 620 may have a coupling end 622 and a drain portion 624. The drain portion 624 may be at an angle below the horizontal plane (X-Y plane). In various embodiments the drain portion 624 may have an angle between 0 and 10 degrees below the horizontal plane. In various embodiments, the drain portion 624 may have an angle between 1 and 8 degrees below the horizontal plane.

By having the supply tube 610 and the drain tube 620 configured with the dual purpose valve assembly 100 as outlined above, the drain system 600 may drain on gravitation force of the fluid only, with the use of line pressure, and/or without the use of line pressure.

Figure 7:
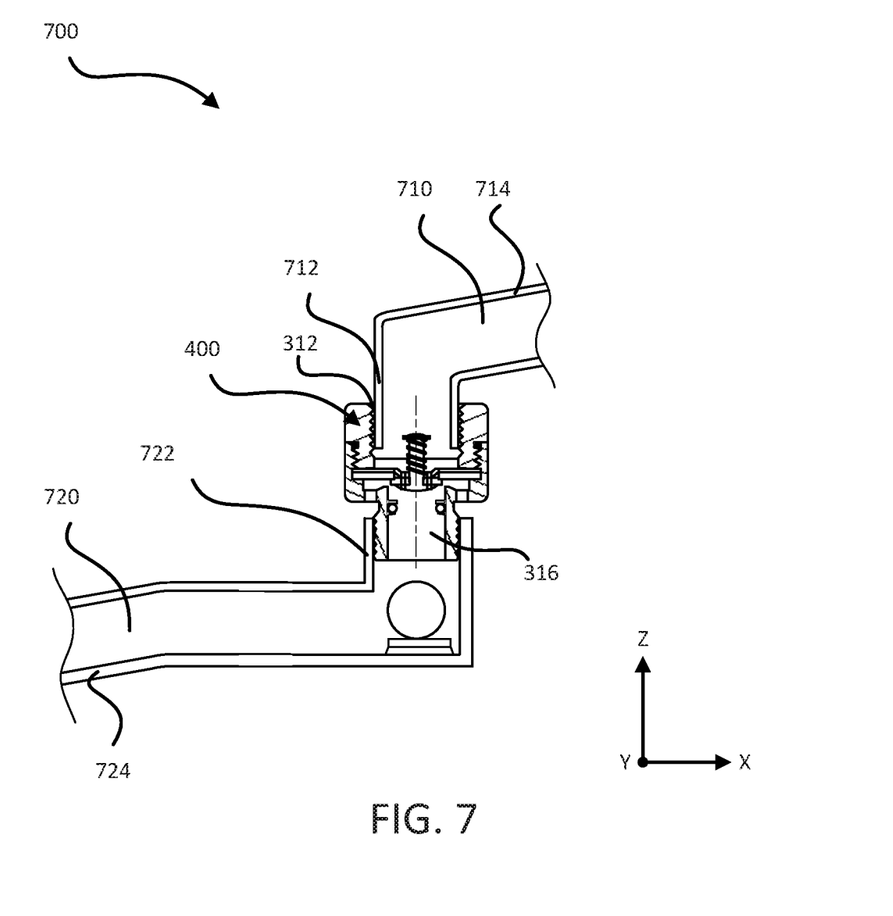
FIG. 7 illustrates a section view of a drain system having a dual purpose valve assembly, in accordance with various embodiments.

With reference now to FIG. 7, a drain system 700, in accordance with various embodiments, is depicted. The drain system 700 comprises a supply tube 710, a drain tube 720 and a dual purpose valve assembly 400. With reference now to FIGS. 4 and 6, the supply tube 710 is coupled to the inlet port 312 and the drain tube 720 is coupled to the outlet port 316. In various embodiments, the supply tube 710 may have a coupling end 712 and supply portion 714. The supply portion 714 may be at an angle above the horizontal plane (X-Y plane). In various embodiments the supply portion 714 may have an angle between 0 and 10 degrees above the horizontal plane. In various embodiments, the supply portion 714 may have an angle between 1 and 8 degrees above the horizontal plane. In various embodiments, the coupling end 712 may be substantially perpendicular to the horizontal plane. Similarly, the drain tube 720 may have a coupling end 722 and a drain portion 724. The drain portion 724 may be at an angle below the horizontal plane (X-Y plane). In various embodiments the drain portion 724 may have an angle between 0 and 10 degrees below the horizontal plane.

In various embodiments, the drain portion 624 may have an angle between 1 and 8 degrees below the horizontal plane. In various embodiments, the coupling end 722 may be in accordance with fitting 420.

By having the supply tube 710 and the drain tube 720 configured with the dual purpose valve assembly 400 as outlined above, the drain system 700 may drain on gravitation force of the fluid only, with line pressure, and/or without the use of line pressure.

Figure 8:
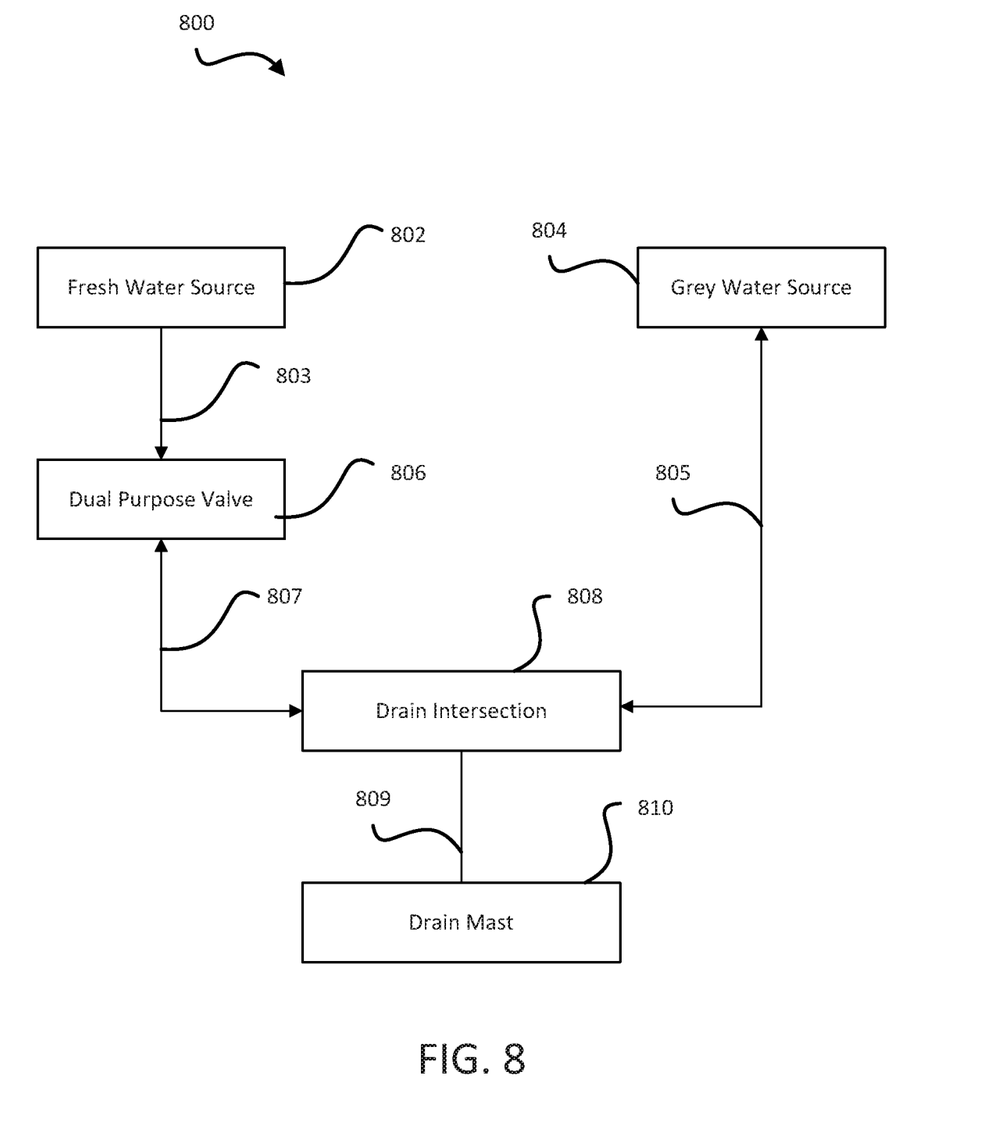
FIG. 8 illustrates block diagram of an aircraft potable water system and associated drain system, in accordance with various embodiments.

Referring now to FIG. 8, a block diagram of a method of operation of an aircraft potable water system and associated drain system, in accordance with various embodiments is depicted. In various embodiments, the aircraft potable water system and associated drain system 800 comprises a fresh water source 802 and a grey water source 804. In a fresh water draining condition, fresh water source 802 may drain through a fresh water drain line 803 to dual purpose valve 806, then through fresh/grey water drain line 807 to intersection 808, then through drain mast drain line 809 to the drain mast 810. In a grey water draining condition, grey water source 804 may drain through grey water drain line 805 to intersection 808, then through drain mast drain line 809 to drain mast 810.

In various embodiments, there may be buildup of water at intersection 808 or drain mast 810 may cause a backflow condition where grey water flows up fresh/grey water drain line 807 to dual purpose valve 806. In various embodiments, dual purpose valve 806 may prevent grey water from entering fresh water drain line 803 and/or fresh water source 802. In various embodiments, fresh water source 802 may experience a vacuum condition creating air suction up fresh water drain line 803. The dual purpose valve may prevent any suction from occurring in fresh/grey water drain line 807. In various embodiments, the grey water source and/or the drain mast may experience a vacuum condition creating an air suction down fresh/grey water drain line 807. The dual purpose valve may prevent any suction from occurring in fresh water drain line 803 and or fresh water source 802. In various embodiments, the aircraft potable water system and associated drain system 800 prevents cross-contamination of grey water and fresh water and/or allows the drainage of water sources via gravity without any line pressure.

Figure 9:
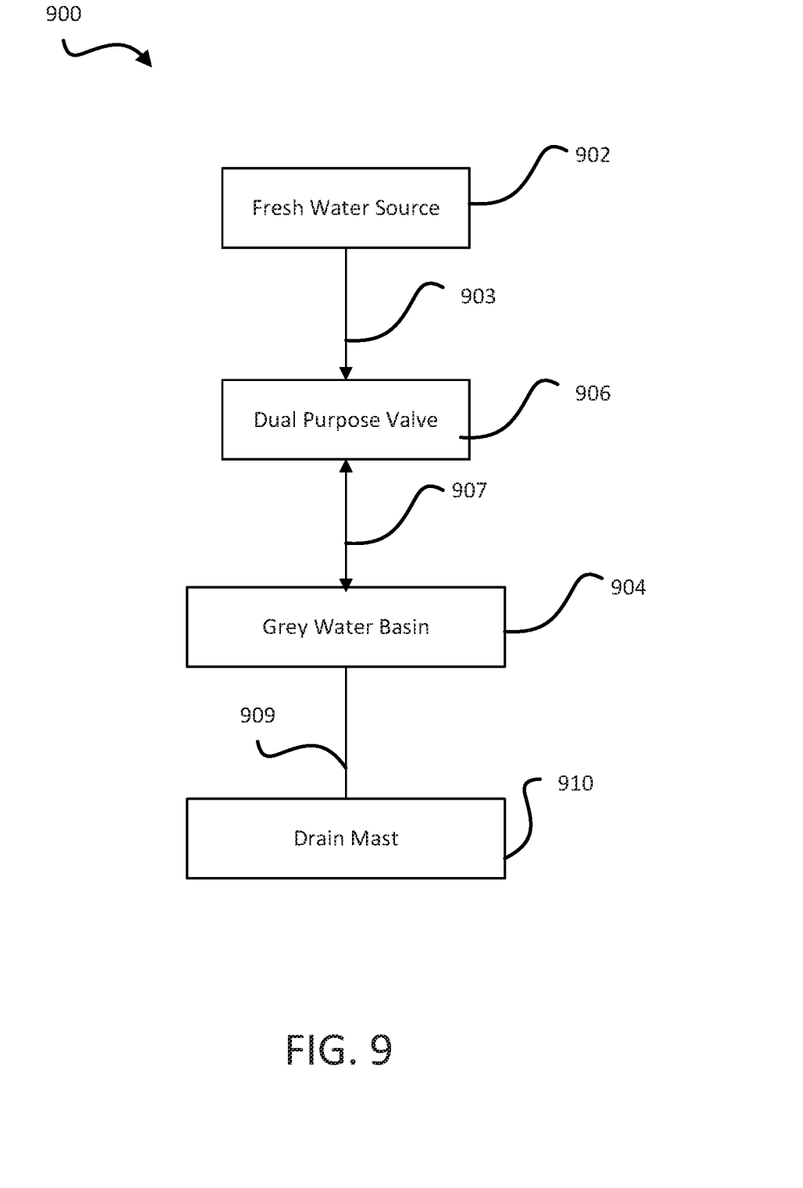
FIG. 9 illustrates block diagram of an aircraft potable water system and associated drain system, in accordance with various embodiments.

Referring now to FIG. 9, a block diagram of a method of operation of an aircraft potable water system and associated drain system, in accordance with various embodiments is depicted. In various embodiments, the aircraft potable water system and associated drain system 900 comprises a fresh water source 902, a dual purpose valve 906, a grey water basin 904, and a drain mast 910. The fresh water source 902 may supply fresh water through supply tubing 903 and dual purpose valve 906 through a faucet to the grey water basin 904. The faucet may have a pull down sprayer that fluidly couples the grey water basin 904 to the dual purpose valve 906. The grey water basin may be fluidly coupled to the drain mast 910 via a drain tubing 909.

In various embodiments, there may be buildup of water at grey water basin 904 and/or drain mast 910 may cause a backflow condition where drain tubing 909 flows grey water through grey water basin 904 and stops at dual purpose valve 906. In various embodiments, dual purpose valve 906 may prevent grey water from entering supply tubing 903 and/or fresh water source 902. In various embodiments, fresh water source 902 may experience a vacuum condition creating air suction up fresh water drain line 903. The dual purpose valve 906 may prevent any suction from occurring in fresh/grey water drain line 907. In various embodiments, the faucet may experience a vacuum condition creating an air suction down the pull down sprayer. The dual purpose valve may prevent any suction from occurring in supply tubing 903 and/or fresh water source 902. In various embodiments, the aircraft potable water system and associated drain system 900 prevents cross-contamination of grey water and fresh water and/or allows the drainage of water sources via gravity without any line pressure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A dual purpose valve assembly, comprising:
   a conduit comprising a first port, a second port, and a third port;
   a first valve configured to have a first open position and a first closed position with the first port, the first valve being configured to close the third port when it is in the first open position, and the first valve being configured to open the third port when it is in the first closed position;

a second valve configured to have a second open position and a second closed position with the second port, wherein the first valve comprises a flapper having a first arm, a second arm, and a fulcrum portion disposed between the first arm and the second arm, the flapper being hingedly coupled to the conduit between the first port and the third port.

2. The dual purpose valve assembly of claim 1, wherein the second valve is configured to prevent a backflow condition.

3. The dual purpose valve assembly of claim 1, wherein the first valve is a vacuum breaker valve and the second valve is a check valve.

4. The dual purpose valve assembly of claim 3, wherein the vacuum breaker valve is the flapper.

5. The dual purpose valve assembly of claim 1, wherein the second valve comprises a ball and an O-ring, the ball being configured to float, contact, and create a seal with the O-ring when the second valve is in the second closed position.

6. The dual purpose valve assembly of claim 5, wherein the second valve further comprises a form, the form being configured to hold the ball when the second valve is in the second open position.

7. A dual purpose valve assembly, comprising:
a conduit having a vacuum breaker cavity, a check valve cavity, a first port, a second port, and a third port;
a flapper disposed in the vacuum breaker cavity between the first port and the third port;
a check valve disposed in the check valve cavity between the vacuum breaker cavity and the second port, wherein the flapper further comprises a first arm, a second arm, and a fulcrum portion disposed between the first arm and the second arm.

8. The dual purpose valve assembly of claim 7, wherein the check valve further comprises a ball and an O-ring, the ball being configured to float, contact, and create a seal with the O-ring when the check valve is in a closed position.

9. The dual purpose valve assembly of claim 8, wherein the check valve further comprises a form, the form being configured to hold the ball when the check valve is in an open position.

10. The dual purpose valve assembly of claim 7, further comprising a cover disposed at the third port, the cover being configured to prevent debris from entering the dual purpose valve assembly.

11. The dual purpose valve assembly of claim 7, wherein the first arm creates a first seal with the first port when the flapper is in a closed position, and wherein the second arm creates a second seal with the third port when the flapper is in an open position.

12. An aircraft comprising:
a potable water system comprising:
a supply tube;
a drain tube; and
the dual purpose valve assembly in accordance with claim 1 disposed between the supply tube and the drain tube.

13. An aircraft comprising:
a potable water system comprising:
a supply tube;
a drain tube; and
the dual purpose valve assembly in accordance with claim 7 disposed between the supply tube and the drain tube.

* * * * *